United States Patent
Chan et al.

(10) Patent No.: US 10,313,727 B2
(45) Date of Patent: *Jun. 4, 2019

(54) CUSTOMIZED CONTENT CHANNEL GENERATION AND DELIVERY FOR SERVICE PROVIDERS

(71) Applicant: Accenture Global Services Limited, Dublin (IE)

(72) Inventors: Christopher Yen-Chu Chan, Jersey City, NJ (US); Lan Guan, Johns Creek, GA (US); John D. Bolze, Rockville, MD (US); Thomas Kim, Toronto (CA)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 15/270,854

(22) Filed: Sep. 20, 2016

(65) Prior Publication Data

US 2017/0064364 A1    Mar. 2, 2017

Related U.S. Application Data

(63) Continuation of application No. 14/838,002, filed on Aug. 27, 2015, now Pat. No. 9,473,805.

(51) Int. Cl.
| | | |
|---|---|---|
| H04H 60/32 | (2008.01) |
| H04N 21/2668 | (2011.01) |
| H04N 21/222 | (2011.01) |
| H04N 21/25 | (2011.01) |
| H04N 21/2665 | (2011.01) |
| H04N 21/258 | (2011.01) |
| H04N 21/442 | (2011.01) |
| H04H 60/46 | (2008.01) |
| H04H 60/66 | (2008.01) |

(Continued)

(52) U.S. Cl.
CPC ........ *H04N 21/2668* (2013.01); *H04H 60/46* (2013.01); *H04H 60/66* (2013.01); *H04N 21/222* (2013.01); *H04N 21/252* (2013.01); *H04N 21/25891* (2013.01); *H04N 21/2665* (2013.01); *H04N 21/4383* (2013.01); *H04N 21/44204* (2013.01); *H04N 21/44213* (2013.01); *H04N 21/44222* (2013.01); *H04H 60/43* (2013.01)

(58) Field of Classification Search
CPC .................................. H04N 21/44213
USPC ........................................ 725/12, 14, 15, 17
See application file for complete search history.

(56) References Cited

U.S. PATENT DOCUMENTS

| | | |
|---|---|---|
| 2003/0145326 A1 | 7/2003 | Gutta et al. |
| 2010/0057560 A1* | 3/2010 | Skudlark ................ G06Q 30/02 705/14.49 |

(Continued)

FOREIGN PATENT DOCUMENTS

JP    2011-233951 A    11/2011

*Primary Examiner* — Pankaj Kumar
*Assistant Examiner* — Sahar Aqil Riaz
(74) *Attorney, Agent, or Firm* — Mannava & Kang, P.C.

(57) ABSTRACT

A customized content selection and delivery system is operable to create a customized content channel package for a subscriber and customized content channel package to a customer premises over a content delivery network. A multi-level analysis based on measured content consumption metrics is performed to select content provider channels for the customized content channel package.

12 Claims, 7 Drawing Sheets

(51) Int. Cl.
*H04N 21/438* (2011.01)
*H04H 60/43* (2008.01)

(56) References Cited

U.S. PATENT DOCUMENTS

| | | | |
|---|---|---|---|
| 2012/0183580 A1* | 7/2012 | Lazdunski | A61K 9/006 424/400 |
| 2014/0082645 A1* | 3/2014 | Stern | H04N 21/26258 725/13 |
| 2014/0351835 A1* | 11/2014 | Orlowski | H04N 21/4383 725/9 |
| 2015/0073889 A1* | 3/2015 | Griffiths | G06Q 30/0224 705/14.25 |
| 2015/0227579 A1* | 8/2015 | Cantarero | G06F 17/30616 707/708 |
| 2016/0007083 A1* | 1/2016 | Gurha | H04N 21/44222 725/13 |

* cited by examiner table 300

| Absolute Volume | Normalized Volume | Regularity | Recency | Value |
|---|---|---|---|---|
| - | - | - | Low | Low |
| H | - | - | - | High |
| M | - | M* | - | High |
| L | - | H* | - | High |
| - | H | - | - | High |
| - | M | M* | - | High |
| - | L | H* | - | High |

330 — value scores for each channel

310 — (derived metric value for channel 2)
311 — (derived metric value for channel 3)
312 — (derived metric value for channel 4)

Definition 301

- H: At least one of the metrics is listed as a High Value
- H*: At least two of the metrics are listed as High Value
- M: All metrics listed as Medium Value
- M*: All metrics listed as Medium or High Value
- L: Combination of Medium and Low Value metrics or all Low value metrics

FIG. 3

CUSTOMIZED CONTENT CHANNEL GENERATION AND DELIVERY FOR SERVICE PROVIDERS

PRIORITY

This application is a Continuation of commonly assigned and co-pending U.S. patent application Ser. No. 14/838,002, filed Aug. 27, 2015, the disclosure of which is hereby incorporated by reference in its entirety.

BACKGROUND

A great variety of different types of content, such as video and music, are available through diverse content delivery systems including cable, satellite, broadcast television systems, the Internet, and satellite radio systems. Examples of types of content that may be delivered through the various content delivery systems include video programming (e.g., broadcast television programming, on-demand video programming), audio programming (e.g., music channels, audio-on-demand programming), user-generated content (e.g., YOUTUBE channels, podcasts), etc.

A service provider providing content to its subscribers typically offers a preset package of channels of content. For example, cable television or satellite television service providers commonly offer preset packages of television channels, which may include sports channels, news channels, network television channels, premium channels, etc. Subscribers may select one of the packages and then have access to all the television channels and programs on those channels in the selected package. In many instances, subscribers may not watch programs available on many of the channels. A similar situation may occur with other types of content. For example, satellite radio may offer fifty to one hundred different channels, but subscribers may not listen to most of the channels. Content providers that deliver streaming video or audio over the Internet may provide the user with the ability to select different programs or podcasts or other types of content to consume on demand, but the content available from these providers may not be as desirable or as current as content provided from the cable television or satellite television service providers. For example, weekly broadcasted television programs that may be available from a cable television or satellite television service provider may not be available from an Internet content provider, such as NETFLIX, or may not be available until a much later time period after the initial broadcast.

BRIEF DESCRIPTION OF DRAWINGS

Features of the present disclosure are illustrated by way of examples shown in the following figures. In the following figures, like numerals indicate like elements, in which:

FIG. 3 illustrates an example of scoring content provider channels, according to an example of the present disclosure;

DETAILED DESCRIPTION

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

According to an example of the present disclosure, a customized content selection and delivery system is operable to generate customized content channel packages for delivery to subscribers of a service provider. Customized content channel packages may include multiple channels of content, referred to as content provider channels. A content provider channel includes content objects, such as television programs, provided by a particular content provider. A channel is not limited to television programs and may include other types of content, such as radio programs, streaming video channels, or any digital audio or video content or web pages. A content provider channel may deliver the content of a particular content provider. For example, a content provider is ESPN or FOX, and ESPN provides it television programs on its content provider channel and FOX provides its television programs on its content provider channel, which may be available in different formats, such as high-definition (HD), standard-definition (SD), three-dimensional (3D), etc. In an example, the customized content channel packages are generated for or by a service provider that delivers content to its subscribers. The customized content channel packages may be generated from content provided from content providers that are different from the service providers.

Figure 1A:
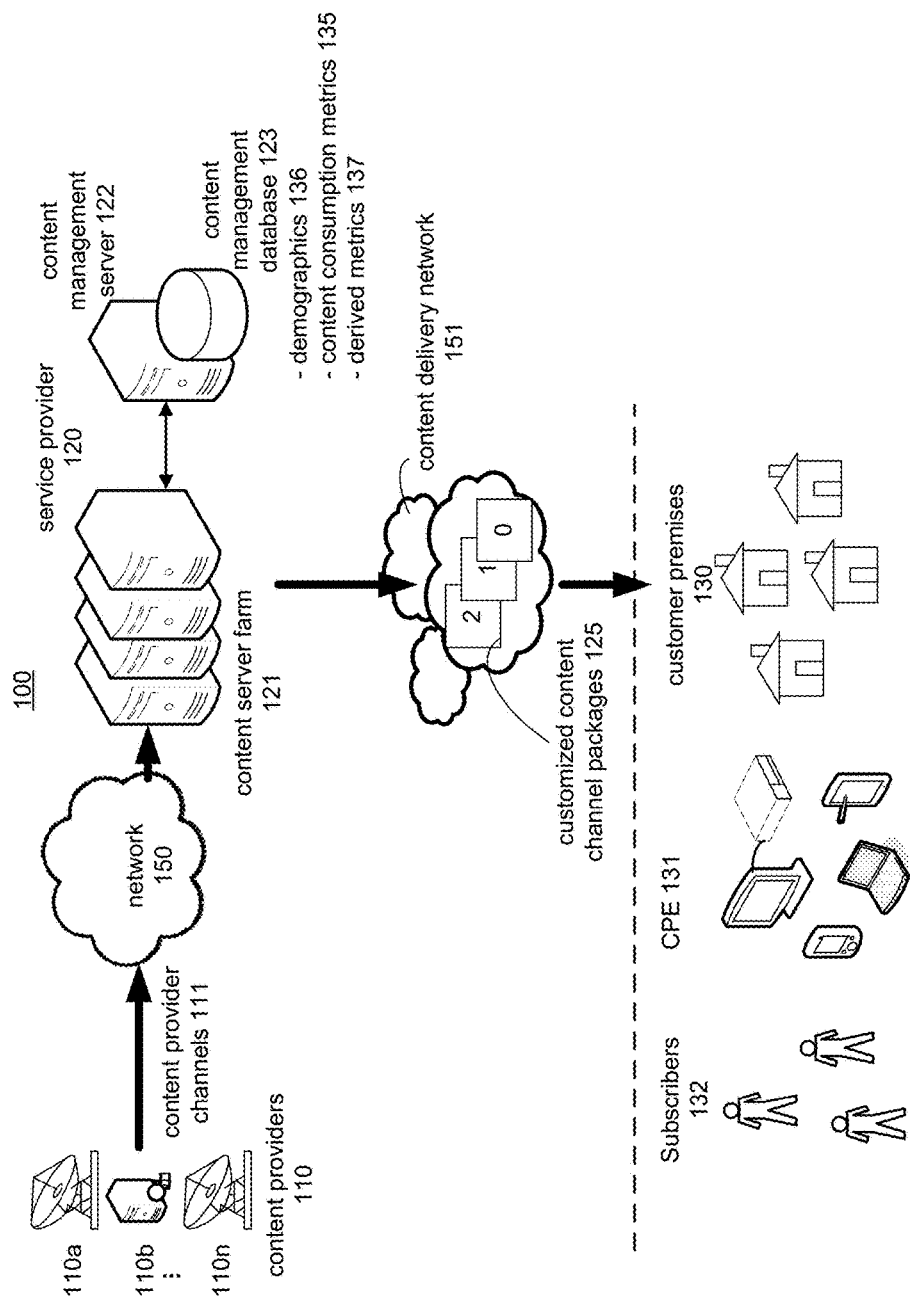
FIGS. 1A-B illustrate a system, according to examples of the present disclosure.

FIG. 1A illustrates a customized content selection and delivery system 100 that is operable to generate customized content channel packages. For example, content providers 110 deliver their content to the service provider 120, such as over a network 150. A content provider may be any organization, entity or individual that creates information for distribution. Content providers 110 are shown as 110a-n but may include any number of content providers. The content providers 110 provide their content provider channels 111 to the service provider 120. The content provider channels 111 include the content objects, such as television programs, radio programs, etc., provided by each content provider. In an example, content provider 110a is a television network providing their television programs in their content provider channel to service providers. The content provider channel may be delivered to the service provider 120 via satellite signals. In an example, content provider 110b may generate a content provider channel on the Internet, such as a YOUTUBE channel or a news feed, and the content provider channel is provided to the service provider 120 via the Internet and/or another type of network.

Service provider 120 generates customized content channel packages 125 from the content received from the content providers 110a-n and delivers the customized content channel packages 125 to its subscribers 132 at customer premises 130 via content delivery network 151. In an example, the service provider 120 is a cable television service provider and the content delivery network 151 may include a fiber optic network for transmitting digital content, including the customized content channel packages 125, to the customer premises 130. The digital content may be encoded and compressed. Customer premises equipment (CPE) 131 at the customer premises 130 decodes and the digital content so it may be played on the CPE 131. For example, CPE 131 may include routers and set top boxes at the customer premises 130 to select programs in customized content channel packages 125 for viewing or playing on a television. CPE 131 may include other types of devices, such as personal computers, laptops, tablets, smart phones, etc. The subscribers 132 may be individuals, companies or other entities and may subscribe to services, such as content services, Internet services, etc. from the service provider 120. A subscriber may pay a fee for services. A subscriber is also referred to as a user. The networks 150 and 151 are described above by way of example and may include any suitable network for transmitting content from the content providers 110 and from the service provider 120 and for transmitting upstream signals from the customer premises 130.

The service provider 120 may include multiple servers for managing and delivering content. For example, content server farm 121 includes multiple servers storing content from the content providers 110 and distributing content, including customized content channel packages 125, to the customer premises 130. The content delivery from the content server farm 121 may be load balanced to maintain a quality of service of the delivered content.

Content management server 122 determines the customized content channel packages 125 for the customer premises. Profile information about the subscribers, including demographics 136, such as age, income, education, geographic location, etc., is gathered and stored in content management database 123. Also, content consumption metrics 135 are measured for example by the CPE 131, and pertain to, for example, when content was played, what content was played, etc., by the subscribers 132. The content consumption metrics 135 may be specific to each subscriber and may be specific to content consumed by a subscriber. The content consumption metrics 135 are collected and stored in the content management database 123. The content management server 122 additionally derives metrics (e.g., derived metrics 137) from the content consumption metrics 135, and the demographics 136 and metrics 135, 137 are used to select content and create the customized content channel packages 125 for each subscriber.

Figure 1B:
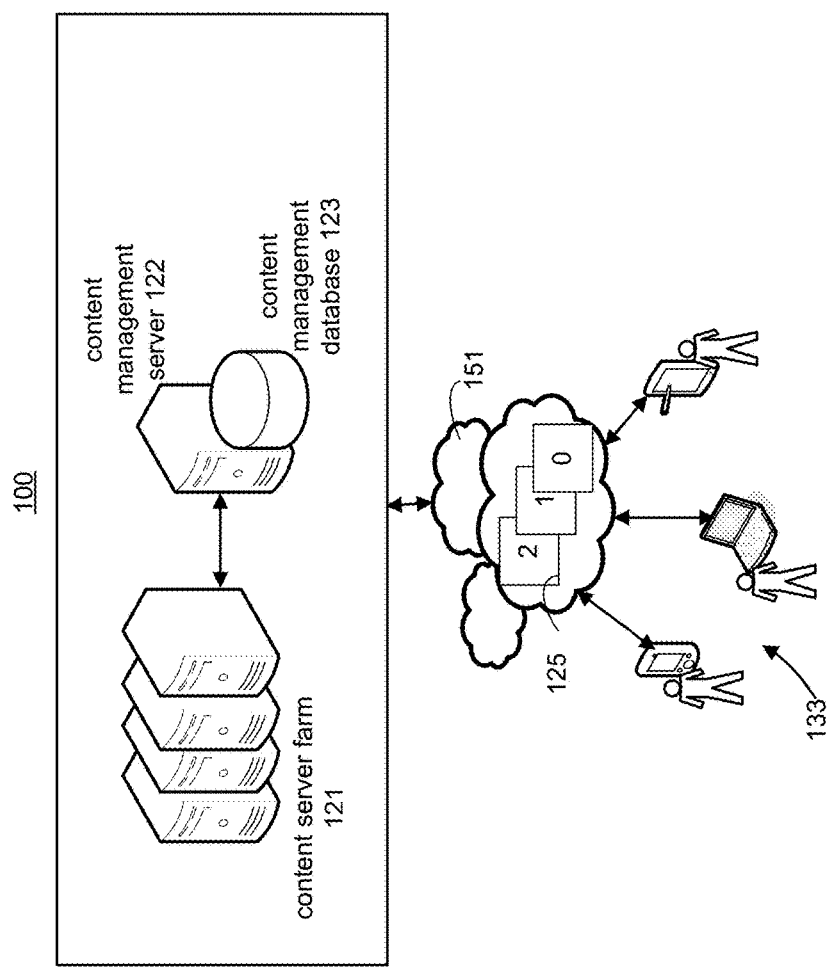

FIG. 1B illustrates a high-level diagram of the customized content selection and delivery system 100. FIG. 1B shows that the system 100 is not limited to a cable television network service provider providing the customized content channel packages 125 to its subscribers via a cable television network. The network 151 may include one or more networks, such as the Internet, local area networks, public or private networks, etc. The customized content channel packages 125, for example, created by the content management server 122, may be delivered to end user devices 133 or other types of computers via the network 151. The content channel packages 125 may include streaming video, streaming audio, satellite radio, satellite or cable television, or other types of content.

In an example, the content management database 123 stores content consumption metrics and user information for users. The content consumption metrics may be measured by the end user devices 133 receiving content delivered by the content management server 122 via the network 151 and/or the content management server 122 or another server measures the content consumption metrics as the content is delivered to the end user devices 133. The content management server 122 may select content provider channels to include in customized content channel packages 125 for the users based on derived metrics determined from the content consumption metrics and content value scores. The customized content channel packages 125 are delivered to the end user devices 133 via the network 151. As discussed in more detail below, the derived metrics may include categories of the content consumption metrics such as absolute volume, normalized volume, regularity and recency. For example, absolute volume is a measure of amount of time a user of the users views a content provider channel of the content provider channels for a predetermined period of time; normalized volume is a measure of amount of time the user of the users views the content provider channel relative to all other of the content provider channels for the predetermined period of time; regularity is a measure of a regular interval the user views or listens to the content provider channel; and recency is a measure of an amount of time since the user last viewed or listened to the content provider channel. The content management server 122 for example is to aggregate the content consumption metrics in each category to determine values for the derived metrics, and determine the content value scores from the values for the derived metrics.

Figure 2:
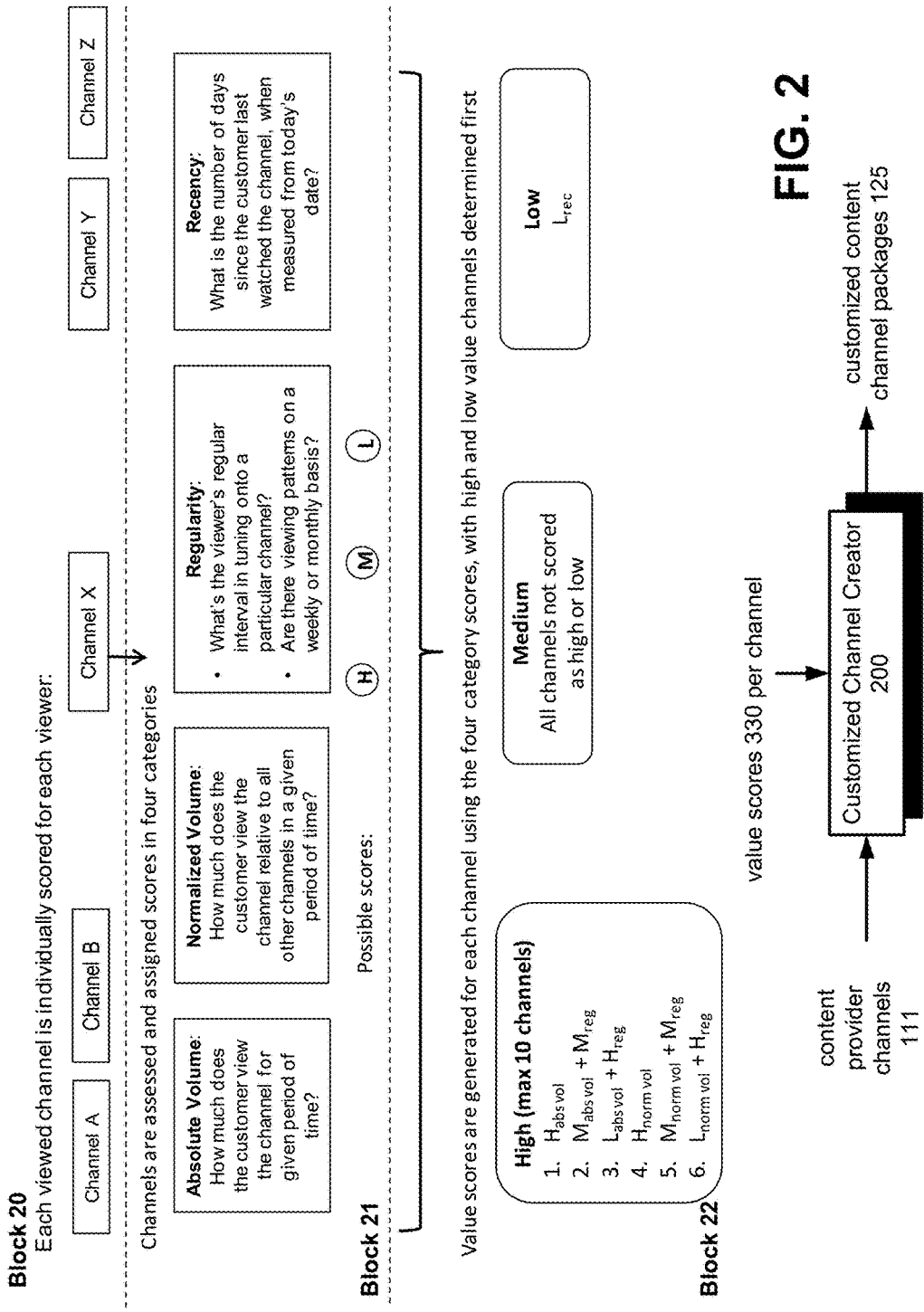
FIG. 2 illustrates a data flow for customized content channel package creation, according to an example of the present disclosure.

FIG. 2 shows an example of a data flow diagram for generating customized content channel packages 125. The operations of the data flow diagram may be performed by the content management server 122 shown in FIGS. 1A-B. The data flow diagram includes blocks 20-23. At block 20, each of the content provider channels 111 are individually scored for each subscriber or viewer. The scoring is based for example on the content consumption metrics 135. Examples of the content consumption metrics 135 (shown as 1-11 below) and how they are calculated are as follows:

1. Did the customer watch this channel? (Flag)
    sum(duration_sec)>0 then 1 else 0
    (If this flag=0 then skip rest of the metrics and set #2-#8 NULL)
    duration_sec is the length of time a channel is watched without changing the channel and may be within a predefined interval such as between 5 minutes and 4 hours (shorter or longer intervals may be used).
2. How long did the customer watch the channel for? (Duration) (Continuous)
    sum(duration_sec) is summed for time period, e.g., 3 months
3. How many days did the customer watch the channel for? (Sessions)
    (Continuous)
    count(distinct start_view) is count for the time period, e.g., 3 months start_view for example is the start of a session. A session start may be a date and time when the subscriber started viewing and/or listening to the channel.
4. How many times did the customer make the effort to come back to the channel at the same time of the day? (Frequency) (Continuous)
    Using a daypart (e.g., time of day), what is the number of days customers (i.e., subscribers) watch the channel at the specific daypart
    MAX(count(distinct start_view)) like #2 but separate out with the dayparts and then take the max from the different dayparts
5. What is the number of days since the customer last watched the channel? (Recency) (Continuous)

Today's Date—Start_Date where Start_Date is from the last time the customer watched this channel
(If the customer did not watch this channel at all, set to NULL)
6. Is the customer a regular weekly viewer? (Regularity) (Continuous)
Stdev(weekly_duration_sec) where weekly_duration_sec is the sum(duration_sec) at the weekly level
7. Is the customer a seasonal viewer? (Regularity) (Continuous)
   a) Month over month % changes and get the min and max to capture seasonality viewers
   b) ([sum of last month's duration_sec]/[sum of this month's duration_sec]); Do this for all the months and obtain Min and Max (If the subscriber's duration_sec=0 for a month, for the calculation, set the above calculations to 1); duration_sec may be at the monthly level but other groupings may be used. For example, month-over-month seasonality may be changed to four calendar-based seasons.
   c) Take the max percent change for the Max's and Min's separately (e.g., two different values determined for #7 "Is the customer a seasonal viewer?")
8. What is the usual interval in tuning into this channel again (Regularity) (Continuous)
   a) Average number of days of all the intervals (Intervals to be used at the daily level) Average(interval_periods) where there are n−1 interval periods where n=#2 (if the customer had viewed the channel only once, then set to NULL)
   b) Interval Period=Start_Date$_{t-1}$−Start_Date$_t$ where t is the date when the customer watched the channel
9. How long did the customer watch the channel for relative to their overall duration viewing? (Duration) (Continuous)
   sum(duration_sec for this channel)/sum(duration_sec in total) where sum for the time period, e.g., 3 months
10. How many days did the customer watch the channel for? (Sessions) (Continuous)
    count(distinct start_view for this channel)/count(distinct start_view in total) where count for the time period, e.g., 3 months
11. How many times did the customer make the effort to come back to the channel at the same time of the day? (Frequency) (Continuous)
    Using the daypart, what is the number of days customers watched the channel at the specific daypart
    Leveraging metric #4, compare the value from metric #4 for this current channel vs the most frequent viewed channel for the customer (per day part) Calculation: $\text{Metric}_{4\_Thischannel}/\text{Metric}_{4\_Max\_ThisCustomer}$ These content consumption metrics or the information for the content consumption metrics may be captured by the CPE 131 and sent to the content management server 122. For example, a set top box at a customer premises may capture the channel information, such as channel watched, how long channel is watched between channel change, etc., and a subscriber identifier or another unique identifier (e.g., MAC ID of set top box) for the subscriber or the customer premises, and send the metrics to the content management server 122 for storage in the content management database 123.

Value buckets are calculated per channel based on measured values for the content consumption metrics 135. For example, referring to metrics 1-11 described above, for metrics 2, 3, 4, 9, 10, and 11, the greater the measured value for the metric, the higher the value bucket. For metrics 6, 7, and 8, the greater the measured value for the metric, the lower the value bucket.

In an example, a value bucket may be based on a distribution of measured metric values for each subscriber to the channel. For example, for each subscriber, metric and channel combination, the metric is assigned as high, medium or low depending on where the metric resides in the distribution of values for each subscriber for the specific channel and metric. In an example, high=Top 20% of the value distribution; medium=20%-80% of the value distribution; and low=80%-100% of the value distribution. For metric 5, i.e., recentness, assigning a high, medium or low may be performed differently and is based on predetermined ranges. For example, high <=7 days; medium <=30 days; and low >30 days. Accordingly, a value bucket of high, medium, or low is determined for each content consumption metric, customer, channel combination.

From the value buckets, the derived metrics 137 may be determined at block 21. For example, the derived metrics 137 may include absolute volume, normalized volume, regularity and recency. Each derived metric is based on a subset (e.g., less than all the metrics 1-11) of the metrics 1-11. For example, absolute volume is determined from metrics 2-4; normalized volume is determined from metrics 9-11; regularity is determined from metrics 6-8; and recency is determined from metric 5.

Each of the derived metrics (e.g., absolute volume, normalized volume, regularity and recency) may be assigned a derived metric value of high, medium or low based on the bucket values for the content consumption metrics in the corresponding subset of the derived metric. FIG. 3 illustrates an example of a table 300 that shows derived metric values for each of the derived metrics of absolute volume, normalized volume, regularity and recency. The derived metric values are for each channel and subscriber. Examples of the definitions of the derived metric values are shown at 301 and are as follows:

H: At least one of the metrics is listed as a High Value
H*: At least two of the metrics are listed as High Value
M: All metrics listed as Medium Value
M*: All metrics listed as Medium or High Value
L: Combination of Medium and Low Value metrics or all Low value metrics.

For example, absolute volume is determined from metrics 2-4. For channel 2 subscriber A, the derived metric value is shown as H (labeled 310 in FIG. 3) because at least one of the value buckets for metrics 2-4 of all the subscribers for this channel is high. For channel 3 subscriber A, the derived metric value is shown as H (labeled 311 in FIG. 3) because all the value buckets for metrics 2-4 all the subscribers for this channel are medium. For channel 4 subscriber A, the derived metric value is shown as L (labeled 312 in FIG. 3) because the value buckets for metrics 2-4 are a combination of low and medium or are all low. Similarly, for the normalized volume, determined from metrics 9-11, a value of H, M, or L is assigned to each channel based on the value buckets for metrics 9-11 according to the definition 301. A similar procedure is performed for regularity and recency.

At block 22 shown in FIG. 2, a value score is determined for each channel per subscriber based on the derived metric values. The value scores may also be low, medium or high. Table 300 in FIG. 3 shows an example of value scores 330 for the content provider channels. For example, a value score for a content provider channel is low if the derived metric value for recency is low (see for example channel 1).

A limit is set to the number of content provider channels that can have a value score of high. For example, a maximum of 10 channels can be high. For a tie breaker, the number of high derived metric values are used to determine which metric is selected as high. Any remaining channels are medium. In an example, the scores are determined in the order of the table 300, so if a score for a channel can be medium or high, the score will be medium if the maximum number of high scores has already been reached.

Referring to FIG. 2, at block 23, the customized content channel packages 125 are determined from the values scores 330. For example, customized channel creator 200 which may comprise software hosted on the content management server 122 and/or specialized hardware creates the customized content channel packages 125.

From the content value scores, the customized channel creator 200 can determine groupings of content provider channels forming the customized content channel packages 125 for its subscribers. The formation of the customized content channel packages 125 is derived through for example, a mix of two approaches. For example, a statistical approach uses an unsupervised learning technique to identify which content complements another content and which content cannibalizes or does not affect other contents. Also, a set of business rules may be created to ensure that the packages recommended are aligned with an overall strategy and vision, and the statistical approach is then tweaked to meet the overall requirements. The statistical approach may be based on demographics of the subscriber and demographics of the subscribers that highly value other channels. Highly-valued channels that have similar demographics may be recommended to the subscriber to create a customized content channel package for the specific subscriber. In another example, the customized channel creator 200 creates different customized content channel packages for different demographics or creates customized content channel packages comprising the high value channels and a subset of the medium and low value channels. Cost may be considered in addition to the content value scores when generating the customized content channel packages. For example, the service provider 120 pays the content providers, for example per subscription, and higher cost channels may be selected for premium customized content channel packages that require higher subscriber fees. Accordingly, in addition to the content value scores 330 other factors may be considered to generate the customized content channel packages 125.

Also, the content value scores 330 may have other uses, such as negotiating rates for content provider channels. Also, the service provider 120 may use the content value scores to negotiate prices with content providers. For example, the service provider 120 may present evidence that say x % of subscribers value the competitor's channels versus the channel of content provider 110a, so service provider 120 should pay less for that channel. Also, the content management server 122 may model subscriber behavior to predict what actions a subscriber may take if their content package is altered or if a new customized content channel package is generated. The predicted actions may be whether the subscriber will subscribe to the new package (e.g., upgrade or downgrade), stay with their existing package or leave the service provider for a new service provider.

Figure 4:
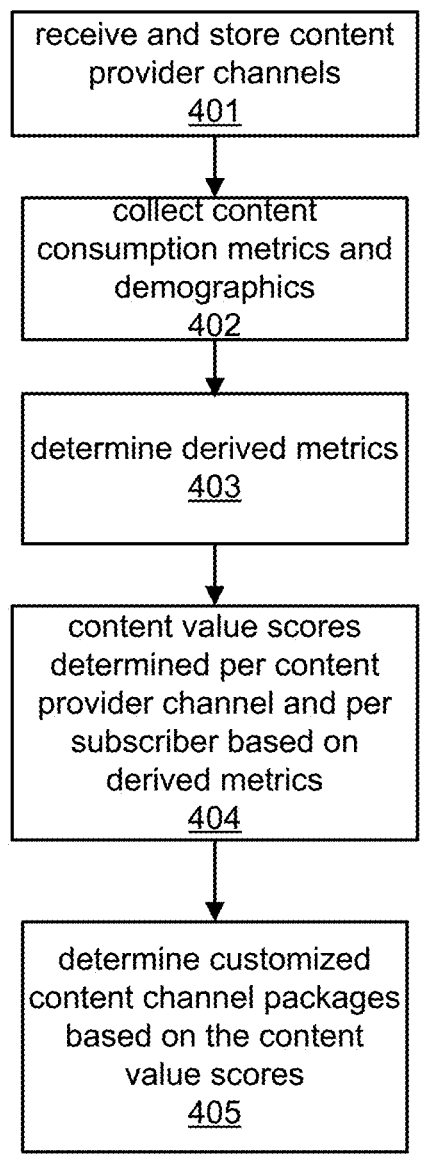
FIGS. 4-5 illustrate flow charts of methods associated with customized content channel package creation, according to examples of the present disclosure.

FIG. 4 illustrates a flow chart of a method 400 for determining the customized content channel packages according to an example. The method 400 is described by way of example with respect to the system 100 shown in FIGS. 1A-B. One or more steps of the method 400 may be performed by the content management server 122 of FIG. 1A-B. Also, one or more of the steps of the method 400 may be performed in an order other than shown or at the same time. At 401, the content management server 122 receives content provider channels 111 and stores the content provider channels 111 in the content server farm 121. The content provider channels 111 are distributed via the content delivery network 151 to subscribers 132 for example at the customer premises 130. The content provider channels 111 may initially not be provided in customized content channel packages or may be provided in customized content channel packages.

At 402, the content manager 122 collects content consumption metrics 135 and demographics and stores this information in the content management database 123. For example, the CPE 131 measures content consumption metrics 1-11 discussed above and sends the measured metrics to the content management server 122. The content management server 122 stores the measured metrics in the content management database 123. Demographics 136 of the subscribers 132 may be gathered from a billing system or other system (including third party data sources) having this information, and the demographics 136 are stored in the content management database 123.

At 403, the content management server 122 determines derived metrics 137, such as absolute volume, normalized volume, regularity and recency, from the content consumption metrics 135. The content consumption metrics 135 and the value scores (e.g., described with respect to block 22 in FIG. 2) are for each subscriber and each content provider channel, and the derived metrics 137 may be for each content provider channel. At 404, content value scores 330 are determined for each content provider channel based on the derived metrics 137. At 405, the content management server 122 determines the customized content channel packages 125 based on the content value scores 330 and other factors as described above.

Figure 5:
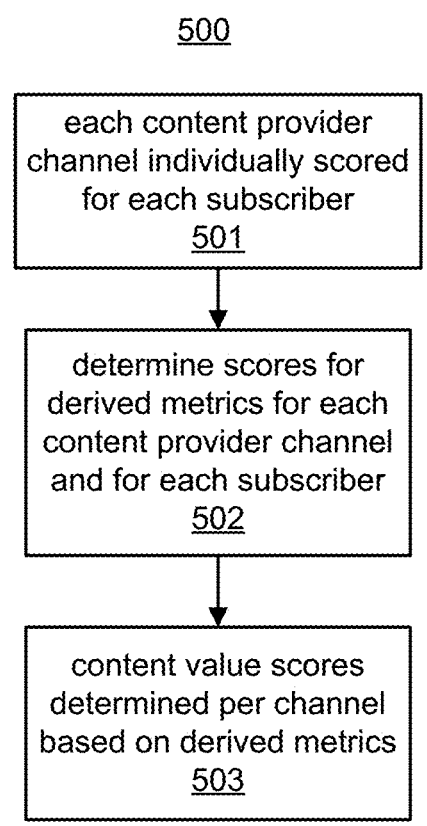

FIG. 5 illustrates a flow chart of a method 500 for determining the content value scores 330 according to an example. The method 500 is described by way of example with respect to the system 100 shown in FIG. 1 and the data flow diagram shown in FIG. 2 and table 300 shown in FIG. 3. One or more steps of the method 500 may be performed by the content management server 122 of FIGS. 1A-B. Also, one or more of the steps of the method 500 may be performed in an order other than shown or at the same time. At 501, each of the content provider channels 111 are individually scored for each subscriber. For example, the value buckets described with respect to block 20 of FIG. 2 are a score for each subscriber and for each channel. In an example, the value bucket may be high, medium or low depending on the values of the content consumption metrics 135 for the subscriber and channel.

At 502, scores are determined for derived metrics for each of the content provider channels 111 and for each subscriber. For example, the derived metrics 137 include absolute volume, normalized volume, regularity and recency. The derived metrics 137 for example are categories of the content consumption metrics 135. Each of the content consumption metrics 135 may be assigned to one of the categories and are aggregated to calculate the associated derived metric. Examples of the determining values for a derived metric based on content consumption metrics in the associated category of the derived metric are described with respect to block 21 in FIG. 2. At 503, content value scores 330 are determined per channel and per subscriber based on the derived metrics, such as described with respect to block 22 in FIG. 2. For example, high and low value channels are determined first, and then all remaining channels are assigned to a medium value.

One or more of the methods, functions and operations described herein may be performed by computer hardware, including a processor or other integrated circuit. In some instances, the processor may execute machine readable instructions stored on a non-transitory computer readable medium to perform the methods, functions and operations described herein.

Figure 6:
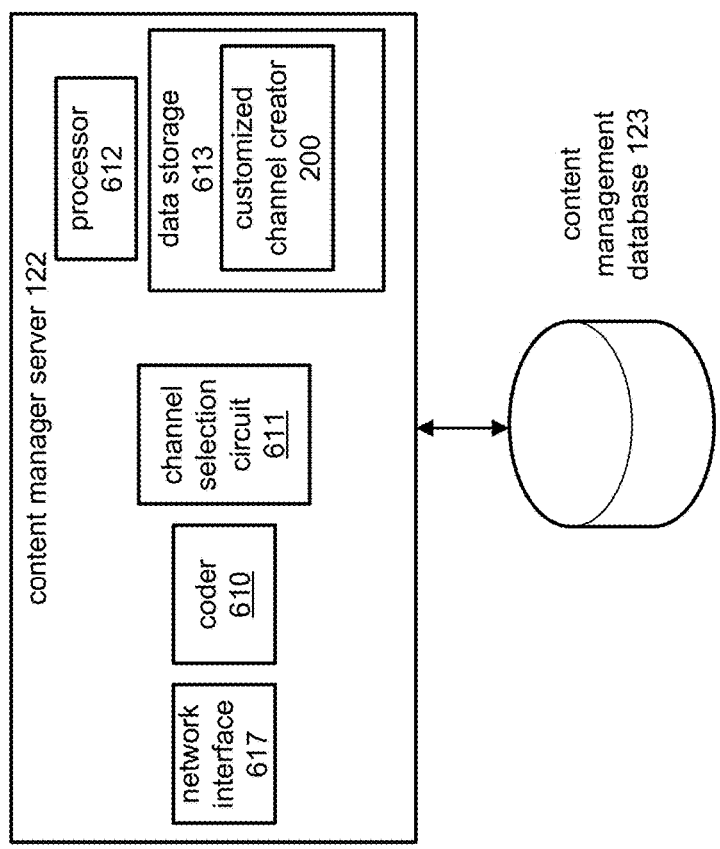
FIG. 6 illustrates a block diagram of system components, according to an example of the present disclosure.

FIG. 6 illustrates an example of hardware components of the content manager server 122. The content manager server 122 may include one or more network interfaces 617 to interface with the network 150 and the content delivery network 151. A processor 612 may be a chipset with central processing unit and/or custom processing circuits, such as an application-specific integrated circuit (ASIC) or field-programmable gate array (FPGA). The processor 612 may execute machine readable instructions for the customized channel creator 200 to determine the content value scores 330 and the customized content channel packages 125 for example according to the methods and operations described herein. The data storage 613 is a non-transitory computer readable medium, such as memory, storing the machine readable instructions. The data storage 203 may include hardware storage devices that are volatile and/or non-volatile. Some examples of the data storage 613 may include RAM (random access memory), ROM (read only memory), EPROM (erasable, programmable ROM), EEPROM (electrically erasable, programmable ROM), hard drives, flash memory, etc. The data storage 613 may store the machine readable instructions and any data used by the content manager server 122. The content manager server 122 for example is a special purpose computer including content channel processing circuits to generate the customized content channel packages 125. Network interface 617 may include one or more network interfaces, wired or wireless, for connecting to the networks 150 and 151. Also, the content manager server 122 may include coder 610 and channel circuit 611. Coder 610 may include an encoder and decoder. For example, content provider channels 111 are received and decoded and selected channels are re-encoded as the customized content channel packages 125 and transmitted to the subscriber(s) subscribing to the customized content channel packages 125. The channel selection circuit 611 may include a mux or other selection circuit programmed by the processor 612 to select content provider channels 111 for the customized content channel packages 125. One or more of the components shown in FIG. 6 may be provided on other servers. For example, a database server may host the content management database 123. Also, encoders and decoders may be provided on other servers receiving channels and distributing channels and packages to subscribers.

The system 100 may be used to create customized content channel packages 125 comprised of individual programs instead of channels of programs. What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims and their equivalents in which all terms are meant in their broadest reasonable sense unless otherwise indicated.

What is claimed is:

1. A device to receive a customized content channel package, the device comprising:
    a network interface connected to a network to receive content provider channels;
    a decoder included in customer premises equipment to decode the content provider channels for playback; and
    a processor to:
        measure content consumption metrics and transmit the content consumption metrics to a content management database of a content selection and delivery system via the network interface, wherein the content consumption metrics comprise:
            whether the device was tuned to a channel of the content provider channels, how long did the device tune to the channel, how many days did the device tune to the channel, how many times did the device tune back to the channel at the same time of day, how many days since the device tuned to the channel, does the device tune to the channel on a weekly basis, does the device tune to the channel seasonally, what is an interval in tuning to the channel, and how long did the device tune to the channel relative to an overall viewing duration; and
        receive, from a content management server of the content selection and delivery system via the network interface, the customized content channel package comprising a plurality of the content provider channels selected based on derived metrics determined from the content consumption metrics.

2. The device of claim 1, wherein the processor is to determine a score for each content provider channel, and the derived metrics are determined from the score for each content provider channel.

3. The device of claim 2, wherein the score for each content provider channel comprises a high, medium or low value determined based on a distribution of content consumption metrics for each content provider channel.

4. The device of claim 3, wherein to determine the score for each content provider channel, the processor is to determine the content provider channels that are assigned the high and low values, and assign any remaining ones of the content provider channels the medium score value.

5. The device of claim 1, wherein the processor is to generate a plurality of customized content channel packages based on different demographics, and each customized content channel package includes the content provider channels having high scores for the different demographics.

6. The device of claim 1, wherein the derived metrics are comprised of categories of the content consumption metrics, and the processor is to aggregate the content consumption metrics in each category to determine values for the derived metrics.

7. The device of claim 6, wherein to aggregate the content consumption metrics in each category, the processor is to determine a definition for assigning the values for the derived metrics based on the content consumption metrics.

8. The device of claim 1, wherein the derived metrics comprise absolute volume, normalized volume, regularity, and recency.

9. A computer-implemented method for customized content delivery over a network, the method comprising:
    receiving, via a network interface connected to a network, content provider channels;
    decoding, by a decoder of customer premises equipment, the content provider channels for playback;
    measuring content consumption metrics by the customer premises equipment, and transmitting the content consumption metrics to a content management database of a content selection and delivery system via the network, wherein the content consumption metrics comprises:
        whether a user watched a channel of the content provider channels, how long was the channel watched, how many days was the channel watched, how many times did the user come back to the channel at the same time of day, number of days since the user last watched the channel, is the user a regular weekly viewer, is the user a seasonal viewer, what is interval in tuning to the channel, and how long did the user watch the channel relative to overall viewing duration of the user; and receiving, from a content management server of the content selection and delivery system and via the network interface, a customized content channel package comprising a plurality of content provider channels selected based on derived metrics determined from the content consumption metrics.

10. The computer-implemented method of claim 9, wherein the derived metrics are comprised of categories of the content consumption metrics, and the processor is to aggregate the content consumption metrics in each category to determine values for the derived metrics.

11. The computer-implemented method of claim 10, wherein to aggregate the content consumption metrics in each category, the processor is to determine a definition for assigning the values for the derived metrics based on the content consumption metrics.

12. The computer-implemented method of claim 9, wherein the derived metrics comprise absolute volume, normalized volume, regularity, and recency.

* * * * *